(12) United States Patent
Imao et al.

(10) Patent No.: US 7,979,249 B2
(45) Date of Patent: Jul. 12, 2011

(54) COMPUTER-READABLE RECORDING MEDIUM WHICH STORES FABRIC MODEL GENERATION PROGRAM, FABRIC MODEL GENERATION APPARATUS AND FABRIC MODEL GENERATION METHOD

(75) Inventors: Koji Imao, Osaka (JP); Takayuki Arai, Nagoya (JP); Yasuharu Kase, Nagoya (JP); Kiyoshi Kawarazaki, Anjo (JP)

(73) Assignee: Toyota Tsusho Corporation (JP)

( * ) Notice: Subject to any disclaimer, the term of this patent is extended or adjusted under 35 U.S.C. 154(b) by 287 days.

(21) Appl. No.: 12/312,665

(22) PCT Filed: Nov. 20, 2007

(86) PCT No.: PCT/JP2007/072467
§ 371 (c)(1),
(2), (4) Date: May 20, 2009

(87) PCT Pub. No.: WO2008/062793
PCT Pub. Date: May 29, 2008

(65) Prior Publication Data
US 2010/0063789 A1    Mar. 11, 2010

(30) Foreign Application Priority Data

Nov. 21, 2006    (JP) .................................. 2006-314825

(51) Int. Cl.
*G06F 17/10*    (2006.01)
*G06G 7/48*    (2006.01)
(52) U.S. Cl. ......... 703/2; 703/1; 703/6; 728/91; 700/98; 345/419
(58) Field of Classification Search .................. 703/1, 2, 703/6; 345/418–420, 426; 428/85, 91; 700/97, 700/98; D05/47, 49
See application file for complete search history.

(56) References Cited

U.S. PATENT DOCUMENTS

| 5,404,426 A | 4/1995 | Usami et al. |
| 5,764,233 A | 6/1998 | Brinsmead et al. |
| 7,275,793 B2 * | 10/2007 | Fujita et al. ............... 297/452.56 |

(Continued)

FOREIGN PATENT DOCUMENTS

JP    2006-065573    3/2006

OTHER PUBLICATIONS

Ito et al., "Textile Design Simulation no Koseidoka Gijutsu", Aichi-Ken Owari Textile Research Center Kenkyu Nenpo, Apr. 1990, No. 11, pp. 138-145.

(Continued)

*Primary Examiner* — Russell Frejd
(74) *Attorney, Agent, or Firm* — Gerald E. Hespos; Michael J. Porco

(57) ABSTRACT

A fabric model generation program, apparatus and method generate a napped fabric model that reproduces the realistic structure of each napped part. A placement portion (130) calculates an initial shape of three-dimensional napped models of the napped parts based on a degree of defiberation, minimum radius and height information, and places the napped models having the calculated initial shape on the base texture model. A flexure energy calculation portion (141) calculates a flexure energy representing the energy of the napped models attempting to flex, on the basis of a yarn stiffness coefficient. A repulsion energy calculation portion (142) calculates repulsion energy between the napped models attempting to repel each other, on the basis of a repulsion coefficient. A final shape calculation portion (143) calculates the final shape of the napped models so that a sum energy obtained by adding the flexure energy and the repulsion energy becomes minimum.

8 Claims, 15 Drawing Sheets

U.S. PATENT DOCUMENTS

| | | | |
|---|---|---|---|
| 7,716,020 B2* | 5/2010 | Imao et al. | 703/1 |
| 2006/0158453 A1 | 7/2006 | Bruderlin et al. | |
| 2009/0119112 A1 | 5/2009 | Imao et al. | |
| 2009/0289940 A1* | 11/2009 | Kimura et al. | 345/426 |

OTHER PUBLICATIONS

Yoshida et al., "Hyomen Fuka Kachi Nit Seihin Kaihatsu", Sen'i Kako, Jun. 1998, vol. 50, No. 6, pp. 284-291.

Watanabe et al., "Computer Animation of Woolly Objects", The Institute of Electronics, Information and Communication Engineers Zenkoku Taikai Koen Ronbunshu, Oct. 1990, Shuki Taikai Pt. 6, p. 338.

Kajiya J.T. et al. —"Rendering fur with three dimensional textures"—Computer Graphics, vol. 23, No. 3, Jul. 1989.

* cited by examiner

COMPUTER-READABLE RECORDING MEDIUM WHICH STORES FABRIC MODEL GENERATION PROGRAM, FABRIC MODEL GENERATION APPARATUS AND FABRIC MODEL GENERATION METHOD

BACKGROUND OF THE INVENTION

1. Field of the Invention

The present invention relates to a computer-readable recording medium which stores a fabric model generation program, fabric model generation apparatus and fabric model generation method for generating a fabric model which is a three-dimensional model of a napped part rising from a base texture model configured by a weaving texture or a knitting texture.

2. Description of the Related Art

In the conventional process of designing and producing a napped fabric having a napped part having a napped base texture part configured by a weaving texture or a knitting texture, a fabric manufacturer that produces the napped fabric produces a plurality of types of prototypes of the napped fabric in response to a request from a client ordering the napped fabric, and provides them with the prototypes. The client selects a prototype closest to his/her request from the plurality of types of prototypes and requests the fabric manufacturer to improve the prototype. The prototype is improved many times by the fabric manufacturer and the client, eventually resulting in completion of a napped fabric requested by the client. Therefore, a tremendous amount of burden is imposed on the fabric manufacturer until the napped fabric is completed to meet the request of the client.

Thus, simulatively displaying the napped fabric by using a computer has been attempted in order to reduce the burden on the fabric manufacturer.

Also, a car seat fabric simulation program for generating a three-dimensional car seat fabric to attach and display the three-dimensional car seat model is known as a technology related to the present application (Japanese Patent Application Publication No. 2006-65573).

However, the conventional technology for simulatively displaying a napped fabric merely displays a two-dimensional data structure of the napped fabric and thus lacks in reality due to its inability to realize the effect provided to the appearance by the fine uneven surface of the napped fabric. Particularly, when attaching the two-dimensional napped fabric model to the car seat or other sterical object and simulatively displaying the car seat, it was mostly the case that an unrealistic car seat was displayed. The technique of JP 2006-65573 does not describe modeling and simulative display of a fine structure of a napped fabric.

SUMMARY OF THE INVENTION

An object of the present invention is to provide a computer-readable recording medium which stores a fabric model generation program, fabric model generation apparatus and fabric model generation method that are capable of generating a napped fabric model in which the structure of a napped part is reproduced realistically.

A computer-readable recording medium which stores fabric model generation program according to the present invention is a fabric model generation program for generating a fabric model which is a three-dimensional model of a napped fabric that has a base texture part configured by a weaving texture or a knitting texture and napped parts rising from the base texture part, the fabric model generation program causing a computer to function as: a base texture model acquisition portion for acquiring a base texture model, which is a three-dimensional model of the base texture part created beforehand in a three-dimensional space; an information acquisition portion for acquiring a degree of defiberation representing a characteristic of yarn fibers attempting to open toward a leading end part of each of yarns used in the napped parts, with the yarn fibers serving to configure the yarns, a yarn stiffness coefficient representing a degree of a characteristic of the yarns attempting not to flex, and a repulsion coefficient representing a characteristic of the yarns attempting to repel each other; a placement portion for calculating, on the basis of the degree of defiberation, an initial shape of napped models, which are three-dimensional models of the napped part, and placing the napped models having the calculated initial shape in predetermined positions of the base texture model; and a napped model generation portion for calculating a flexure energy representing a degree of flexing of the napped models on the basis of the yarn stiffness coefficient, calculating a repulsion energy representing an energy between the napped models repelling each other, on the basis of the repulsion coefficient, and correcting the shape of the napped models so that the both energies become minimum.

A fabric model generation apparatus according to the present invention is a fabric model generation apparatus for generating a fabric model which is a three-dimensional model of a napped fabric that has a base texture part configured by a weaving texture or a knitting texture and napped parts rising from the base texture part, the fabric model generation apparatus having: a base texture model acquisition portion for acquiring a base texture model, which is a three-dimensional model of the base texture part created beforehand in a three-dimensional space; an information acquisition portion for acquiring a degree of defiberation representing a characteristic of yarn fibers attempting to open toward a leading end part of each of yarns used in the napped parts, with the yarn fibers serving to configure the yarns, a yarn stiffness coefficient representing a degree of a characteristic of the yarns attempting not to flex, and a repulsion coefficient representing a characteristic of the yarns attempting to repel each other; a placement portion for calculating, on the basis of the degree of defiberation, an initial shape of napped models, which are three-dimensional models of the napped part, and placing the napped models having the calculated initial shape in predetermined positions of the base texture model; and a napped model generation portion for calculating a flexure energy representing a degree of flexing of the napped models on the basis of the yarn stiffness coefficient, calculating a repulsion energy representing an energy between the napped models repelling each other on the basis of the repulsion coefficient, and correcting the shape of the napped models so that the both energies become minimum.

A fabric model generation method according to the present invention is a fabric model generation method for generating a fabric model which is a three-dimensional model of a napped fabric that has a base texture part configured by a weaving texture or a knitting texture and napped parts rising from the base texture part, the fabric model generation method having: a step in which a computer acquires a base texture model, which is a three-dimensional model of the base texture part created beforehand in a three-dimensional space; a step in which the computer acquires a degree of defiberation representing a characteristic of yarn fibers attempting to open toward a leading end part of each of yarns used in the napped parts, with the yarn fibers serving to configure the yarns, a yarn stiffness coefficient representing a degree of a characteristic of the yarns attempting not to flex, and a repulsion coefficient representing a characteristic of the yarns attempting to repel each other; a step in which the computer calculates, on the basis of the degree of defiberation, an initial shape of napped models, which are three-dimensional models of the napped part, and places the napped models having the calculated initial shape in predetermined positions of the base texture model; and a step in which the computer calculates a flexure energy representing a degree of flexing of the napped models on the basis of the yarn stiffness coefficient, calculates a repulsion energy representing an energy between the napped models repelling each other on the basis of the repulsion coefficient, and corrects the shape of the napped models so that the both energies become minimum.

According to these configurations, the placement portion calculates the initial shape of each napped model by using the degree of defiberation representing a characteristic of yarn fibers attempting to be opened toward a leading end part of each of yarns used in the napped part, the yarn fibers configuring the yarns, and places the napped models in predetermined positions. The napped model generation portion calculates the flexure energy representing the degree of flexing of the napped models disposed in the base texture model, by using the yarn stiffness coefficient representing the degree of a characteristic the yarns attempting not to flex, calculates the repulsion energy representing an energy between the napped models repelling each other, the napped models being disposed in the base texture model, and corrects the shape of the napped models so that the flexure energy and the repulsion energy become minimum.

Specifically, because the shape of each napped model is corrected with the introduction of the concept of the flexure energy and repulsion energy of the napped models so that the both energies become minimum, a napped fabric model in which the structure of the napped part is reproduced realistically can be generated.

DETAILED DESCRIPTION OF THE PREFERRED EMBODIMENTS

Figure 1:
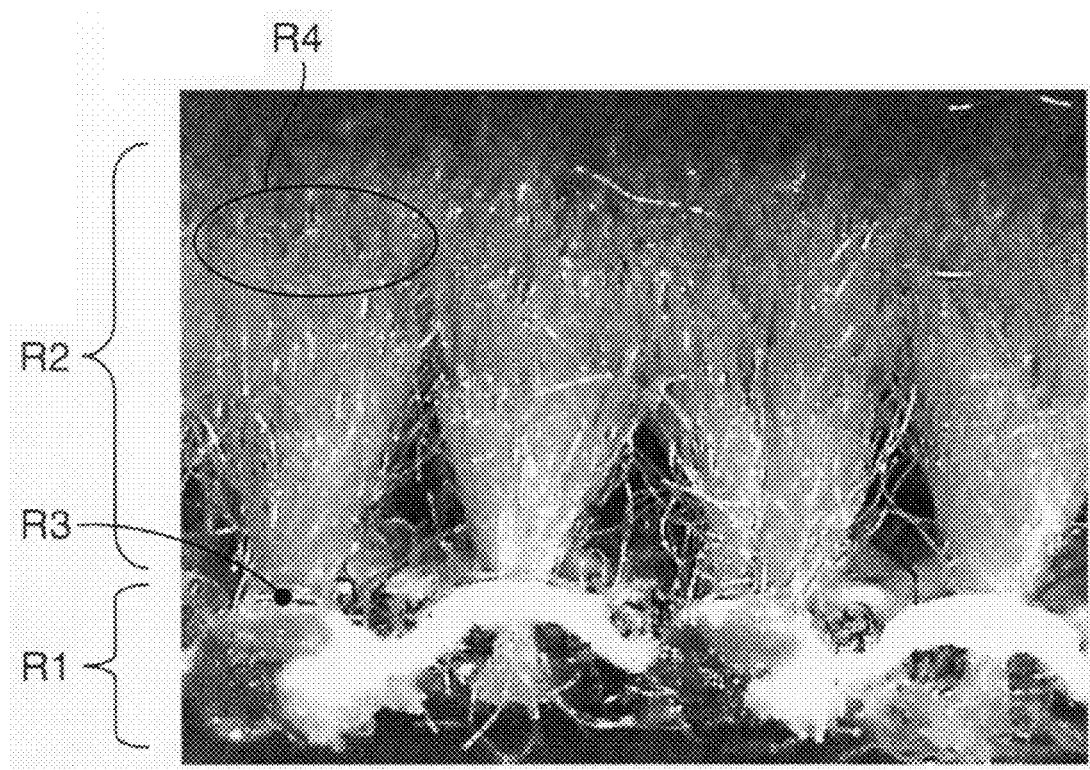
FIG. 1 shows an enlarged diagram of an actual napped fabric model which is a simulation object of a fabric model generation apparatus according to the present invention.

The fabric model generation apparatus according to an embodiment of the present invention is described hereinafter with reference to the drawings. FIG. 1 shows an enlarged diagram of an actual napped fabric model which is a simulation object of the fabric model generation apparatus. This napped fabric has a weaving structure called "moquette," and is provided with a flat base texture part R1 and a plurality of napped parts R2 arrayed on the surface of the base texture part R1. Each napped part R2 rises from a starting point R3 on the surface of the base texture part R1 and is configured by yarns extending in a height direction. Because each yarn is characterized that a thread of yarn fibers configuring the yarn is untwisted at a leading end part, each napped part R2 has a substantially conical shape in which the cross section thereof increases toward the leading end part R4.

Figure 2:
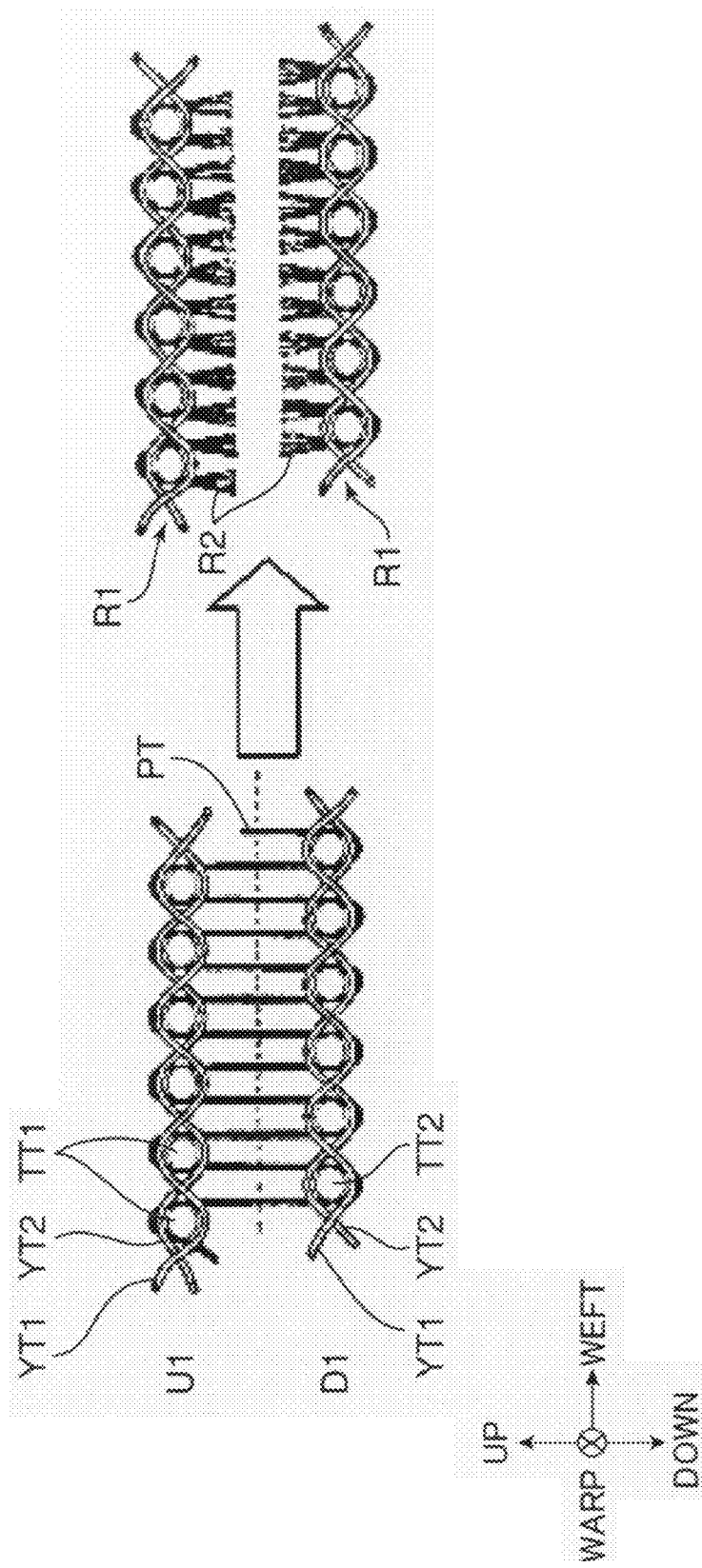
FIG. 2 is a cross-sectional view of the napped fabric showing a process for producing the actual napped fabric.

FIG. 2 is a cross-sectional view of the napped fabric showing a process for producing the actual napped fabric. As shown in FIG. 2, the napped fabric has an upper fabric U1, lower fabric D1, and pile yarn PT connecting the upper fabric U1 and the lower fabric D1, and is completed by cutting the pile yarn PT. Specifically, the upper fabric U1 has a plurality of warp yarns TT1 arrayed parallel to a vertical axis, and weft yarns YT1, YT2 arrayed in a meandering manner between the warp yarns TT1. The lower fabric D1 also has the same configuration as the upper fabric U1. The pile yarn PT connects the upper fabric U1 and the lower fabric D1 together by meandering alternately between each warp yarn TT1 of the upper fabric U1 and a warp yarn TT2 of the lower fabric D1. Note that the weft yarns YT1, YT2 and the pile yarn PT are arrayed in plurality in a direction parallel to the vertical direction. By cutting the pile yarn PT at a substantially central position between the upper fabric U1 and the lower fabric D1, a thread of yarn fibers configuring the pile yarn PT is untwisted at the cut plane, and consequently a napped fabric having a plurality of conical napped parts R2 formed therein is completed on the surface of the base texture part R1 configured by the upper fabric U1 or the lower fabric D1.

Figure 3:
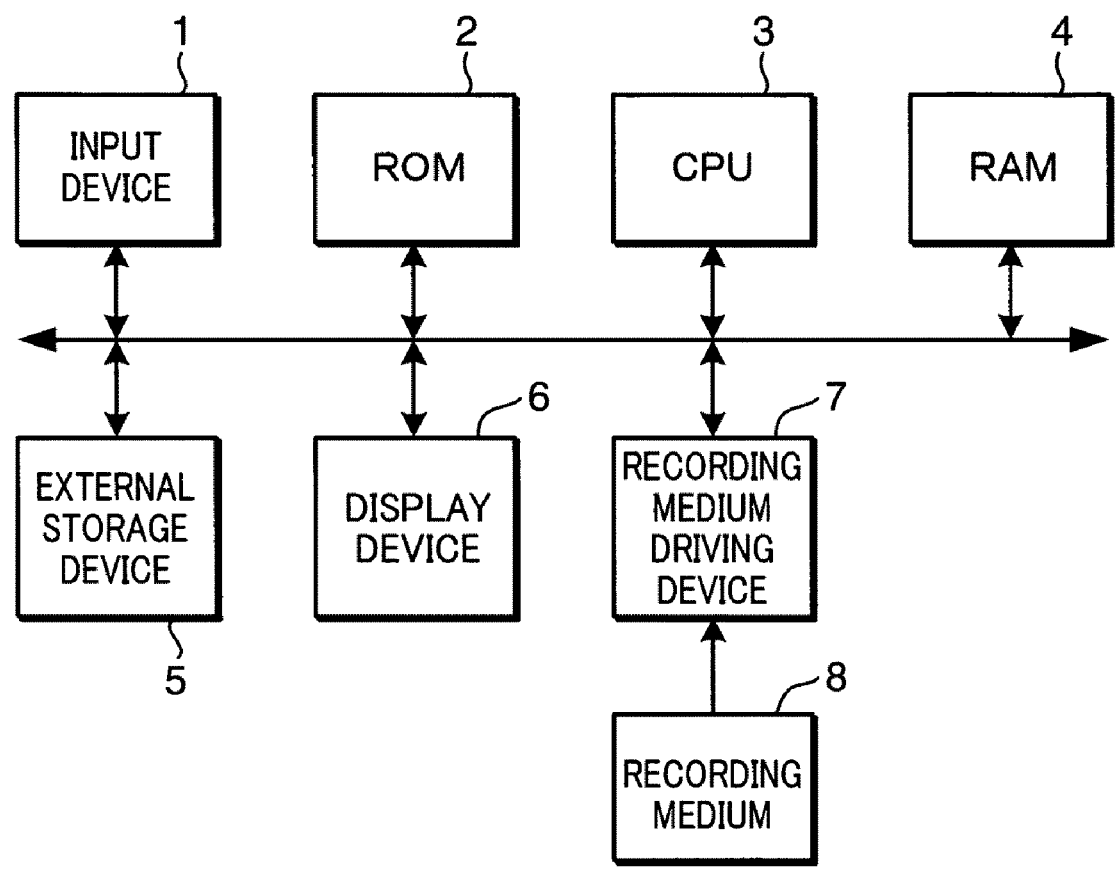
FIG. 3 is a block diagram showing a hardware configuration of the fabric model generation apparatus according to an embodiment of the present invention.

FIG. 3 is a block diagram showing a hardware configuration of the fabric model generation apparatus according to the embodiment of the present invention. This fabric model generation apparatus is configured by a normal computer or the like and has an input device 1, ROM (read-only memory) 2, CPU (central processing unit) 3, RAM (random access memory) 4, external storage unit 5, display device 6, and recording medium driving device 7. Each block is connected to an internal bus, via which various data items are input/output, and various processes are executed under the control of the CPU 3.

The input device 1 is configured by a keyboard, mouse, and the like, and is used by a user to input various data items. The ROM 2 stores a system program such as a BIOS (Basic Input/Output System) and the like. The external storage unit 5 is configured by a hard disk drive and the like and stores a predetermined OS (Operating System), a fabric model generation program, and the like. The CPU 3 reads the fabric model generation program and the like from the external storage unit 5 and controls the operation of each block. The RAM 4 is used as a work area of the CPU 3.

The display device 6 is configured by a liquid display device or the like and displays various images under the control of the CPU 3. The recording medium driving device 7 is configured by a CD-ROM drive, flexible disk drive and the like.

Note that the fabric model generation program is stored in a computer-readable recording medium 8, such as a CD-ROM, and distributed to the market. The user causes the recording medium driving device 7 to read this recording medium 8 to install the fabric model generation program on the computer. Moreover, the fabric model generation program may be installed on the computer by storing the fabric model generation program in a server on the internet and then downloading the fabric model generation program from the server.

Figure 4:
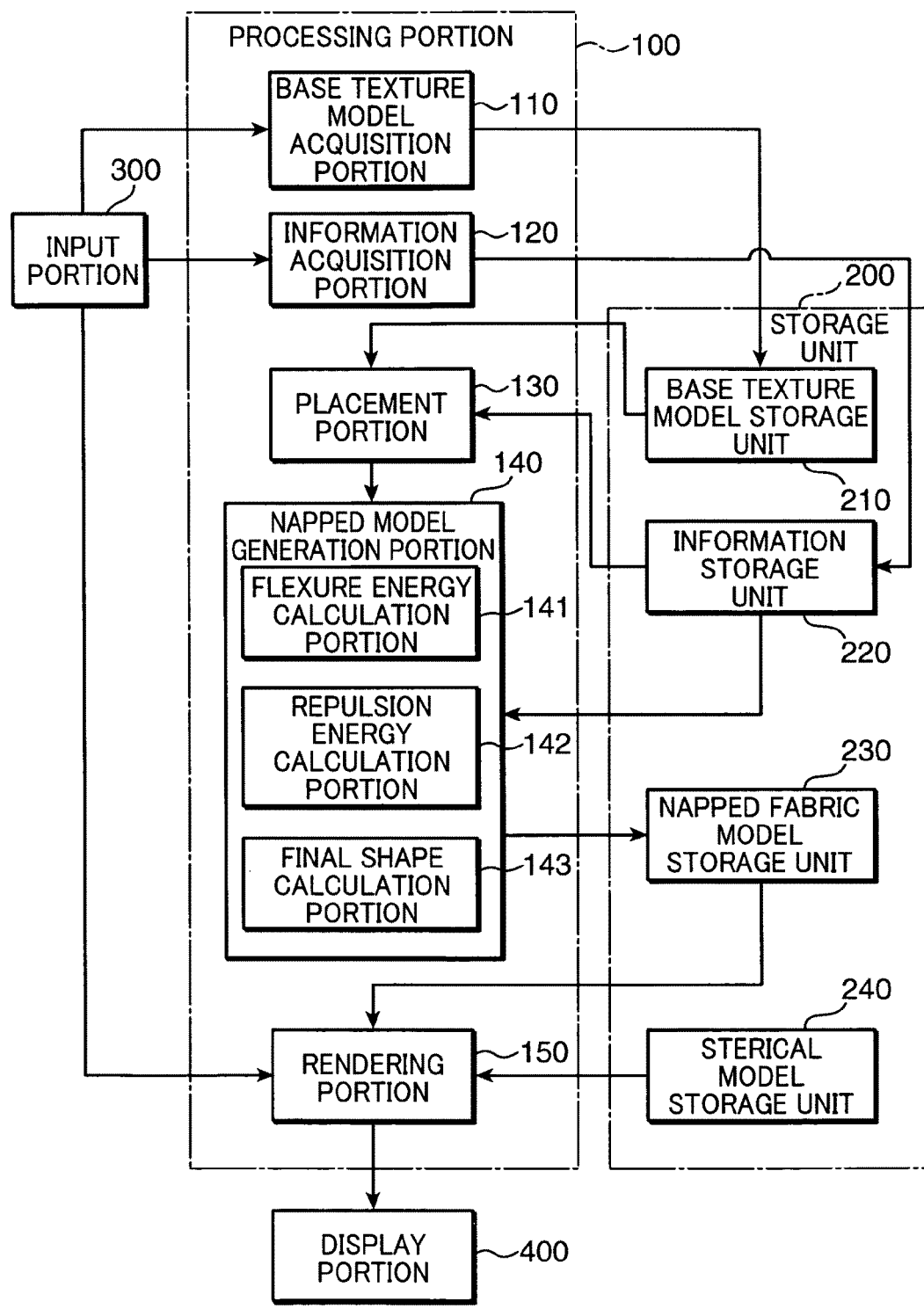
FIG. 4 shows a functional block diagram of the fabric model generation apparatus.

FIG. 4 is a functional block diagram of the fabric model generation apparatus. The fabric model generation apparatus has a processing unit 100, storage unit 200, input portion 300 and display portion 400. The processing unit 100 is configured by the CPU 3 and has functions such as a base texture model acquisition portion 110, information acquisition portion 120, placement portion 130, napped model generation portion 140, and rendering portion 150. These functions are realized by the CPU 3 executing the fabric model generation program.

The base texture model acquisition portion 110 acquires a base texture model that is input by the user through an operation of the input portion 300, and stores the input base texture model in a base texture model storage unit 210. Here, the base texture model is a three-dimensional model in which the structure of the base texture part R1 is expressed three-dimensionally in a virtual three-dimensional space. The base texture model is created beforehand by using, for example, the technique described in Patent Document 1. Specifically, the technique described in Patent Document 1 creates the sterical structure of the base texture part R1 within the three-dimensional space as the base texture model by causing the warp yarns and the weft yarns configuring the base texture part R1 to meander on the basis of texture information related to the texture of the base texture part R1, forming the weaving structure into a sterical shape, and changing, on the basis of yarn information related to the yarns used in the base texture part R1, the thickness of either the warp yarns or weft yarns in accordance with a force exerted against the other yarns. Instead of a woven fabric, a warp knit, weft knit or other knit that is modeled three-dimensionally may be employed as a base texture part model.

The information acquisition portion 120 acquires yarn information, which represents information related to yarns used in napped parts R2 and is input by the user through an operation of the input portion 300, and reference shape information representing a reference shape of each napped part R2 of a napped fabric serving as a simulation object, and stores these information in an information storage unit 220. Here, the yarn information includes the degree of defiberation, yarn stiffness coefficient and repulsion coefficient, while the reference shape information includes the minimum radius and height information.

Figure 16:
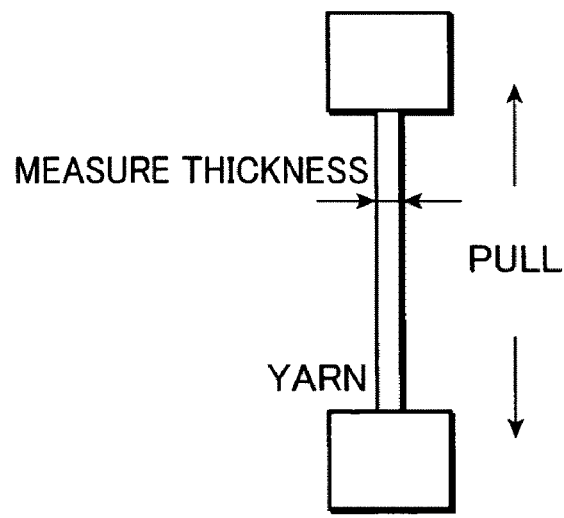
FIG. 16 is an explanatory diagram of the degree of defiberation.

The degree of defiberation represents the characteristic of the yarn whose fibers attempt to be opened toward a leading end part of the yarn, and is acquired using, for example, a technique shown in FIG. 16. FIG. 16 is an explanatory diagram of the degree of defiberation. As shown in FIG. 16, the degree of defiberation is defined by the ratio between the maximum thickness of the yarn and the minimum thickness of the yarn, the ratio being obtained by measuring the thickness of the yarn which changes depending on a tension applied thereto by a tension tester, while changing the tension by securing one end of the yarn and pulling the other end of the same by means of the tension tester.

Figure 17:
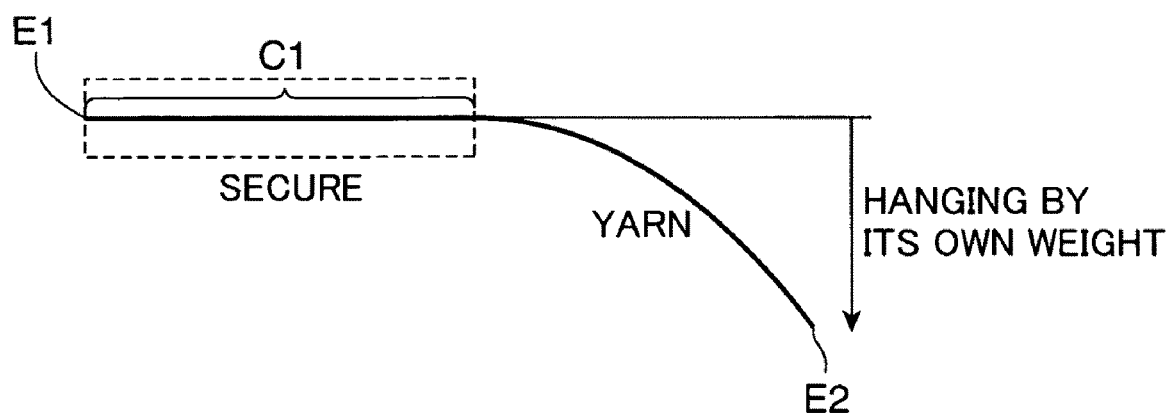
FIG. 17 is an explanatory diagram of a yarn stiffness coefficient.

The yarn stiffness coefficient represents the degree of a characteristic of the yarn attempting not to flex, and is acquired by using, for example, a technique shown in FIG. 17. FIG. 17 is an explanatory diagram of the yarn stiffness coefficient. As shown in FIG. 17, the yarn stiffness coefficient is obtained by securing a predetermined length C1 from an end E1 of the yarn while holding a predetermined length of the yarn horizontally, and measuring how much of the other end E2 of the yarn hangs by its own weight.

Figure 18:
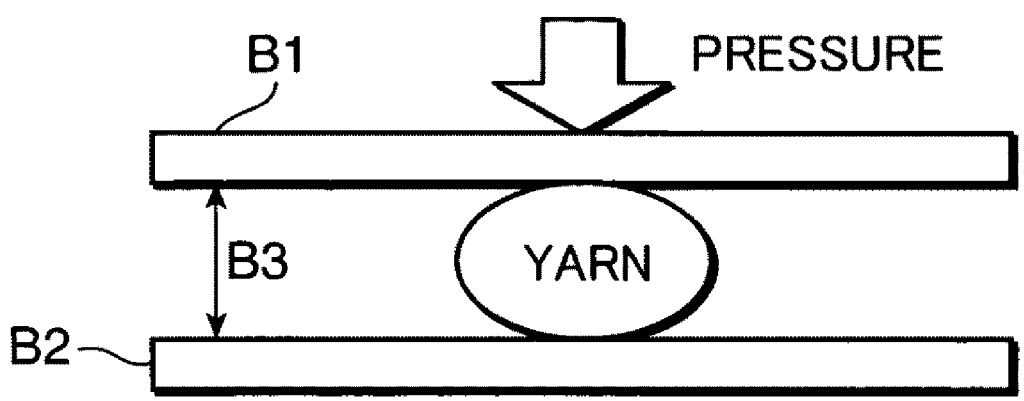
FIG. 18 is an explanatory diagram of a repulsion coefficient.

The repulsion coefficient represents a characteristic of the yarn attempting to repel each other, and is acquired by using, for example, a technique shown in FIG. 18. FIG. 18 is an explanatory diagram of the repulsion coefficient. As shown in FIG. 18, the repulsion coefficient is obtained by using a yarn compression device sandwiching and compressing each yarn between boards B1, B2, to measure the relationship between a gap B3 between the boards B1, B2 and the pressure compressing the yarn, and then adjusting, based on the measured relationship, the pressure so that a simulation result matches the actual model.

The minimum radius represents the minimum radius of the cross section of each napped part R2 of the napped fabric serving as the simulation object. The height information represents the height of the napped part R2 of the napped fabric serving as the simulation object. The values of the degree of defiberation, yarn stiffness coefficient, repulsion coefficient and minimum radius vary in accordance with the type of yarn, and experimentally obtained values are employed.

The placement portion 130 reads out the base texture model from the base texture model storage unit 210 and places the base texture model within the virtual three-dimensional space. Furthermore, the placement portion 130 reads out the degree of defiberation, minimum radius and height information from the information storage unit 220, calculates, on the basis of the read the degree of defiberation, minimum radius and height information, the initial shape of napped models, each of which is a three-dimensional model of each napped part, and places the napped models having the calculated initial shape in predetermined positions of the base texture model. Here, the predetermined positions in which the napped models are placed correspond to the starting points R3 shown in FIG. 1 and exists in plurality on the surface of the base texture model.

Specifically, the placement portion 130 places the napped model in each starting point R3 of the base texture model in the height direction perpendicular to the surface of the base texture model, with line segments of the length corresponding to the height information as napped center lines. The placement portion 130 sets any one of the plurality of napped center lines as a target napped center line, divides the target napped center line into n (n is an integer of 2 or more) to form n line segments, sets an upper end of each divided line segment as an end point, and sets any one of the n end points as a target end point. As a radius, the placement portion 130 sets a value obtained by multiplying the ratio of the height of the target end point to the height of the napped model by the minimum radius and the degree of defiberation. As a cross section of the target napped model at the target end point, the placement portion 130 sets a circle orthogonal to the target napped center line. Then, the placement portion 130 sets a cross section on each target end point to set n cross sections on the target napped center line, and calculates the initial shape of the napped model.

The napped model generation portion 140 has a flexure energy calculation portion 141, repulsion energy calculation portion 142, and final shape calculation portion 143, deforms the shape of the napped model placed by the placement portion 130 to correct the napped model.

The flexure energy calculation portion 141 reads out the yarn stiffness coefficient from the information storage unit 220 and calculates the flexure energy representing the degree of flexing of the napped model on the basis of the yarn stiffness coefficient.

Specifically, the flexure energy calculation portion 141 sets any one of the end points on the target napped center line as the target endpoint, calculates a correction target position of the target end point from the direction of a line segment that connects the end point below the target end point to the second end point below the target end point, multiplies the difference between the target end point and the correction target position by the yarn stiffness coefficient, and thereby calculates the flexure energy of the target end point. The flexure energy calculation portion 141 then adds up the flexure energies of the target end points to calculate the flexure energy of the target napped center line, and adds up the flexure energies of the target napped center lines to calculate the flexure energy of the entire napped fabric model.

The repulsion energy calculation portion 142 calculates the repulsion energy that represents the energy between the napped models repelling each other, on the basis of the repulsion coefficient. Specifically, the repulsion energy calculation portion 142 sets one of the plurality of napped models as a first target napped model, and a napped model intersecting with the first target napped model as a second target napped model, multiplies the value representing the size of the region where the first target napped model overlaps with the second target napped model by the repulsion coefficient to obtain the repulsion energy of the first target napped model, and then adds up the repulsion energy of the first target napped models to obtain the repulsion energy of the entire napped fabric model.

The final shape calculation portion 143 deforms the shape of the napped models so that the flexure energies and the repulsion energies become minimum, and calculates the final shape of the napped models. Specifically, the final shape calculation portion 143 adds up the flexure energies and the repulsion energies to calculate a total energy, and corrects the positions of n end points and the size of the cross section on each napped center lines. Moreover, when the minimum value of the total is obtained, the final shape calculation portion 143 also sets a side surface and upper surface of each napped model to calculate the final shape of the napped models.

The rendering portion 150 reads out the napped fabric model from a napped fabric model storage unit 230 in accordance with an operation command of the user that is received by the input portion 300, renders the read napped fabric and displays it on the display portion 400. The rendering portion 150 also reads out a sterical model from a sterical model storage unit 240 in accordance with an operation command of the user that is received by the input portion 300, reads out the napped fabric model from the napped fabric model storage unit 230, attaches the read napped fabric model to the sterical model as a three-dimensional texture, renders the sterical model, and displays it on the display portion 400.

The storage unit 200 configured by the external storage device 5 and the like shown in FIG. 3 has functions such as the base texture model storage unit 210, information storage unit 220, napped fabric model storage unit 230, and sterical model storage unit 240.

The base texture model storage unit 210 stores the base texture model acquired by the base texture model acquisition portion 110. The information storage unit 220 stores the yarn information and reference shape information acquired by the information acquisition portion 120. The napped fabric model storage unit 230 stores the napped fabric model generated by the napped model generation portion 140. The input portion 300 is configured by the input device 1 shown in FIG. 3 and receives an operation command for acquiring the base texture model, an operation command for acquiring the yarn information and reference shape information, and an operation command for rendering the napped fabric. The display portion 400 is configured by the display device 6 and displays the napped fabric model rendered by the rendering portion 150 and the sterical model.

Figure 5:
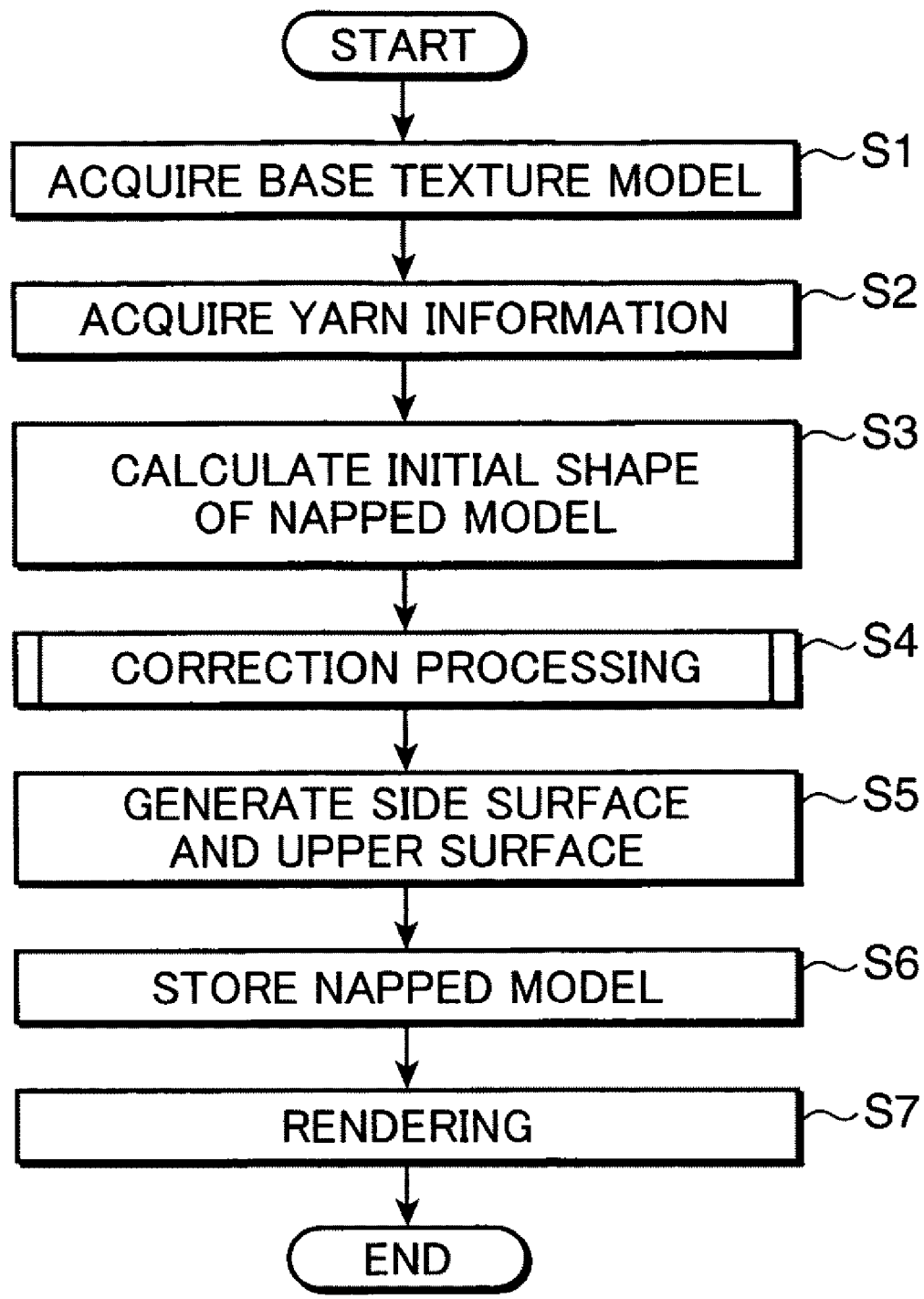
FIG. 5 is a flowchart showing an operation of the fabric model generation apparatus.

Next, an operation of the fabric model generation apparatus is described. FIG. 5 is a flowchart showing an operation of the fabric model generation apparatus. First, the base texture model acquisition portion 110 acquires the base texture model in accordance with the operation command received by the input portion 300 and stores the base texture model in the base texture model storage unit 210 (step S1). Next, the information acquisition portion 120 acquires the yarn information and the reference shape information in accordance with the operation command received by the input portion 300 and stores the yarn information and the reference shape information in the information storage unit 220 (step S2).

Next, the placement portion 130 reads out the base texture model from the base texture model storage unit 210 and places the base texture model in the virtual three-dimensional space. Here, the virtual three-dimensional space is expressed by three coordinate axes of an x-axis, y-axis and z-axis, and the placement portion 130 places the base texture model such that the surface thereof is positioned on, for example, an xy plane.

Figure 7:
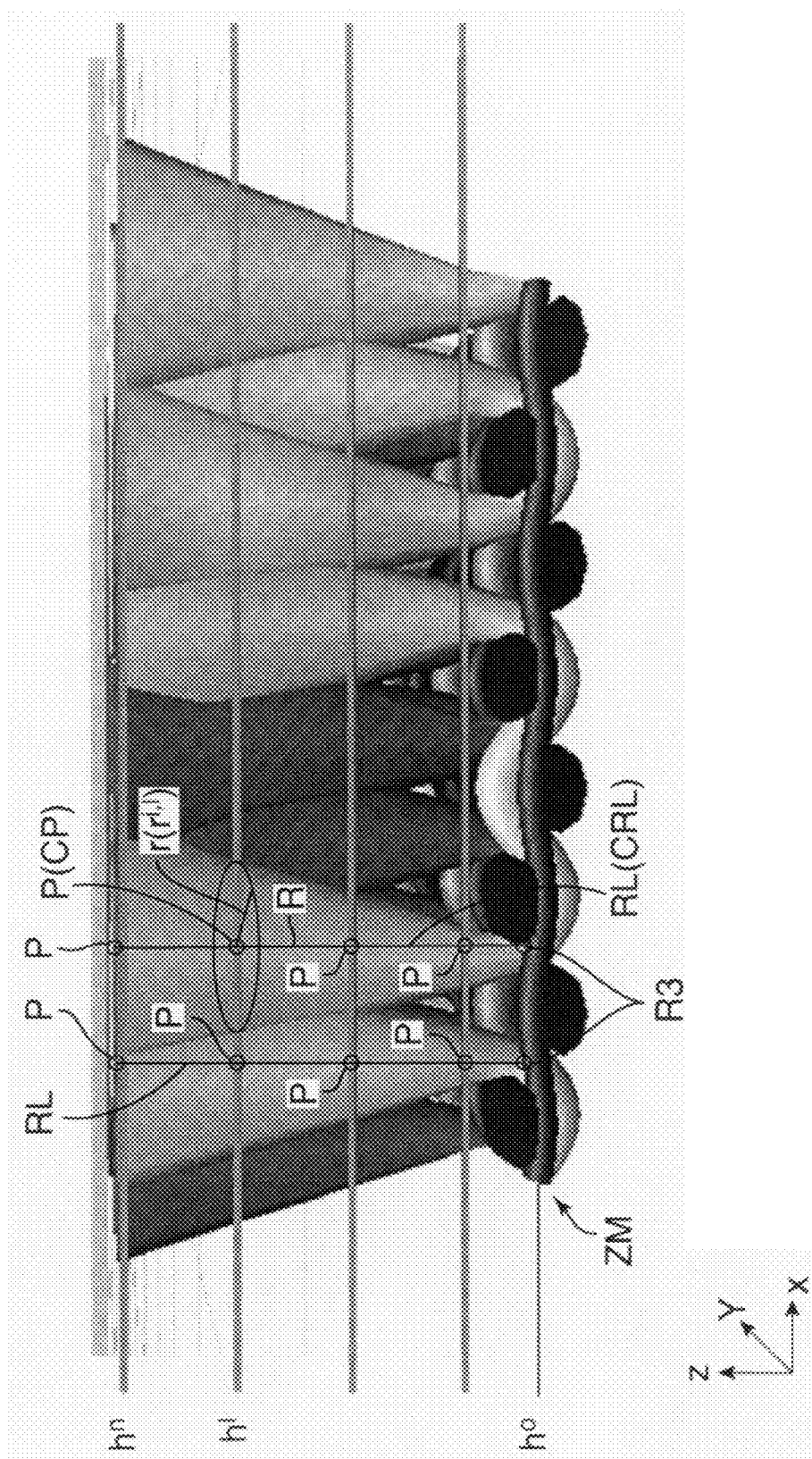
FIG. 7 is a diagram showing napped models placed by a placement portion.

Next, the placement portion 130 calculates the initial shape of each napped model by using the degree of defiberation, minimum radius and height information stored in the information storage unit 220 (step S3). FIG. 7 is a diagram showing the napped models placed by the placement portion 130. As shown in FIG. 7, the placement portion 130 first places line segments having the length corresponding to the height information, as the napped center lines RL, the line segments, in the height direction (z direction) perpendicular to the surface of a base texture model ZM, in each of the plurality of starting points R3 placed on the surface of the base texture model ZM.

Next, the placement portion 130 sets any one of the napped center lines RL as the target napped center line CRL, divides the target napped center line CRL into n, and obtains upper ends of n line segments as end points P. The placement portion 130 then sets any one end point P of the n end points P on the target napped center line CRL as a target end point CP, and calculates the radius r of a circle representing the cross section of the napped model on the target end point CP by using Equation (1).

$$r^{i,l} = (h^l - h^0)/(h^n - h^0) \cdot R^i \cdot (O^i - 1) + R^i \quad (1)$$

Here, $r^{i,l}$ represents the radius of the cross section at the end point P that is located at the lowest point from the bottom of a $i^{th}$ napped model. The $i^{th}$ napped model represents the $i^{th}$ napped model of the plurality of napped models. Moreover, $h^l$ represents the height of the end point P located at the $l^{th}$ from the bottom, and $h^0$ represents the height of the end point located at the $0^{th}$ from the bottom. In addition, $(h^l-h^0)/(h^n-h^0)$ represents the ratio of the height of the end point P to the height of the napped model. Because the $0^{th}$ end point P represents the starting point R3 and the surface of the base texture model ZM is positioned on the xy plane, $h^0$ equals to 0. $R^i$ represents the minimum radius of the cross section of the $i^{th}$ napped model. $O^i$ represents the degree of defiberation of the $i^{th}$ napped model, and $h^n$ represents the height of the top end point P. Here, a value that varies depending on the napped model may be employed as $R^i$, $O^i$, or the same value may be employed for all napped models. Furthermore, $r^{i,0}$ equals to $R^i$ in Equation (1). In this manner, the placement portion 130 obtains the radius of the cross section in each target end point CP and calculates the initial model of each napped model.

Figure 6:
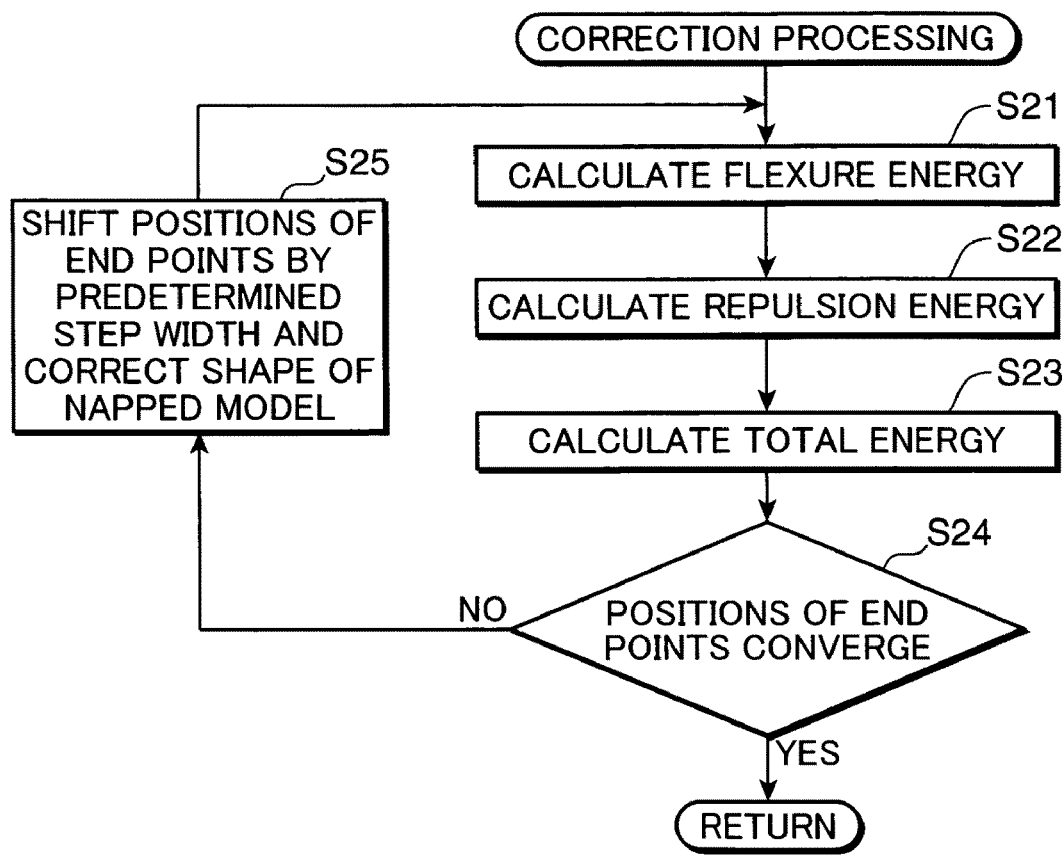
FIG. 6 is a flowchart showing a correction processing.
Figure 8:
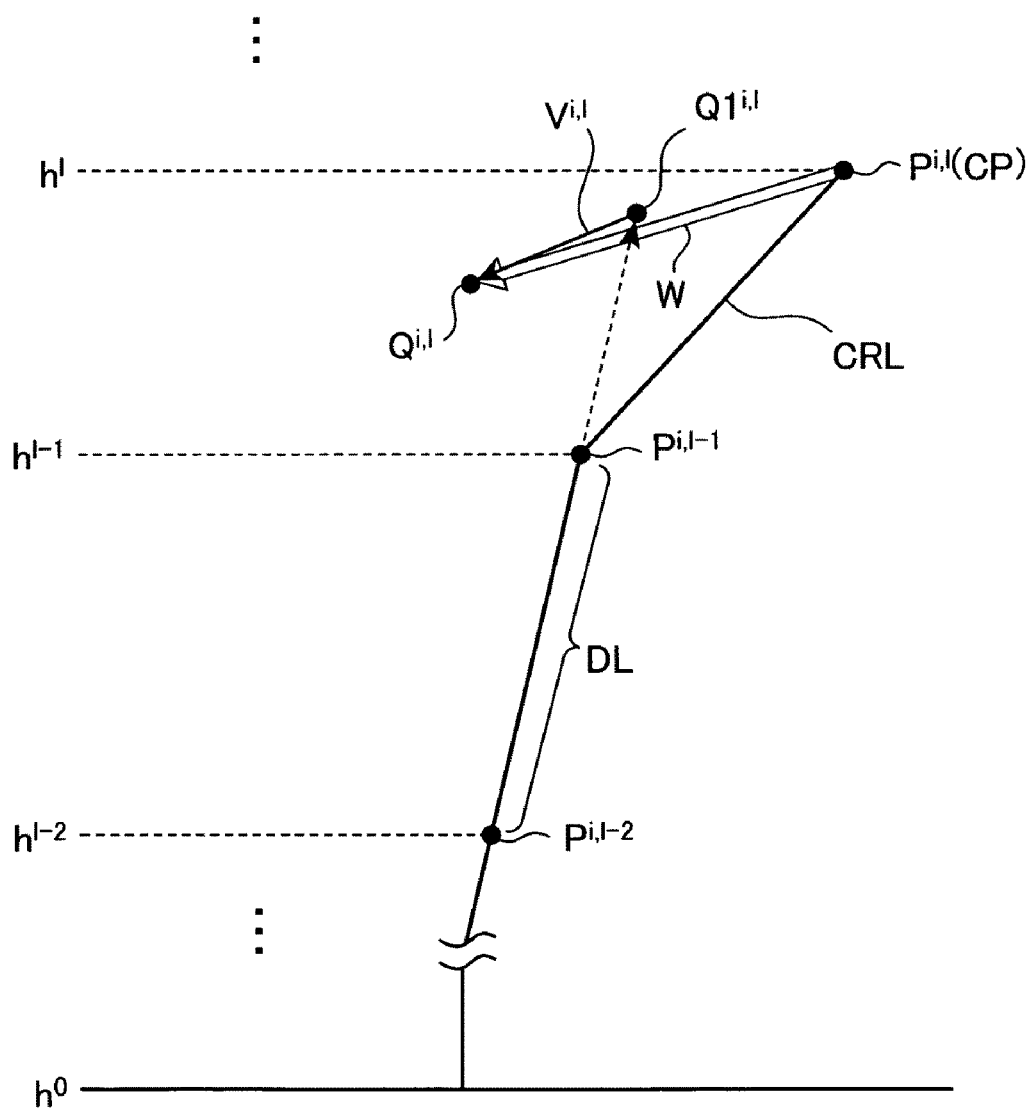
FIG. 8 is a diagram for explaining a flexure energy calculation step.

Next, the napped model generation portion 140 executes a correction processing for deforming the shape of the napped model in step S4 shown in FIG. 5. FIG. 6 is a flowchart showing the correction processing. First, the flexure energy calculation portion 141 calculates the flexure energy in the following manner by using the yarn stiffness coefficient stored in the information storage unit 220 (step S21). FIG. 8 is a diagram for explaining a flexure energy calculation step. Note that the target napped center line CRL shown in FIG. 8 is the target napped center line CRL obtained when executing the correction processing several times.

First, the flexure energy calculation portion 141 sets, as shown in FIG. 8, the end point $p^{i,l}$ of the target napped center line CRL as the target endpoint CP, and calculates a flexure energy $Eb^{i,l}$ of the target end point $p^{i,l}$ by using Equation (2-1) and Equation (2-2).

$$Eb^{i,l}=(1/2)\cdot|p^{i,l}-\{(p^{i,l-1}-p^{i,l-2})\cdot(h^l-h^{l-2})/(h^{l-1}-h^{l-2})+p^{i,l-2}+v^{i,l}\}|^2 \text{ (when } l>1) \quad (2\text{-}1)$$

$$Eb^{i,l}=(1/2)\cdot|p^{i,l}-\{(h^1-h^0)\cdot d^i+p^{i,0})+v^{i,l}\}|^2 \text{ (when } l=1) \quad (2\text{-}2)$$

Here, $p^{i,l}$ shown in FIG. 8 represents the $l^{th}$ end point P of the $i^{th}$ napped model. $p^{i,l-1}$ represents the $l\text{-}1^{th}$ end point P of the $i^{th}$ napped model, and $p^{i,l-2}$ represents the $l\text{-}2^{th}$ end point P of the $i^{th}$ napped model. Furthermore, $p^{i,l}$, $p^{i,l-1}$, $p^{i,l-2}$ shown in Equation (2-1) represent position vectors of end points $p^{i,l}$, $p^{i,l-1}$, $p^{i,l-2}$, respectively. In addition, $v^{i,l}$ is a bias vector for providing a certain bias to the inclination of the $i^{th}$ napped model. This bias vector is set in accordance with inclination information described hereinafter.

In Equation (2-1), "$(p^{i,l-1}-p^{i,l-2})\cdot(h^l-h^{l-2})/(h^{l-1}-h^{l-2})+p^{i,l-2}$" represents a position vector of a point $Q1^{i,l}$ positioned on the extension of a line segment DL connecting the end point $p^{i,l-2}$ to the end point $p^{i,l-1}$, as shown in FIG. 8. A point $Q^{i,l}$ obtained by combining the position vector of the point $Q1^{i,l}$ and the bias vector $v^{i,l}$ is the correction target position. The flexure energy $Eb^{i,l}$ of the target end point $p^{i,l}$ has a value corresponding to the size of a vector W connecting the end point $p^{i,l}$ and the point $Q^{i,l}$ together. Moreover, $d^i$ shown in Equation (2-2) represents the direction of the napped center line RL at the end point $P^0$ of the $i^{th}$ napped model.

Next, the flexure energy calculation portion 141 obtains the flexure energy $Eb^{i,l}$ of each target end point CP and calculates the flexure energy $Eb^i$ of the $i^{th}$ napped model by computing Equation (3).

$$E_b^i = \sum_{l=2}^{n} S^i E_b^{i,l} \quad (3)$$

Here, $S^i$ represents the yarn stiffness coefficient in relation to the $i^{th}$ napped model. Note that a value that varies depending on the napped model may be employed as the yarn stiffness coefficient, or the same value may be employed for all napped models.

The flexure energy calculation portion 141 then adds the flexure energy $Eb^i$ of each napped model to calculate the flexure energy Eb of the entire napped fabric model.

Figure 9:
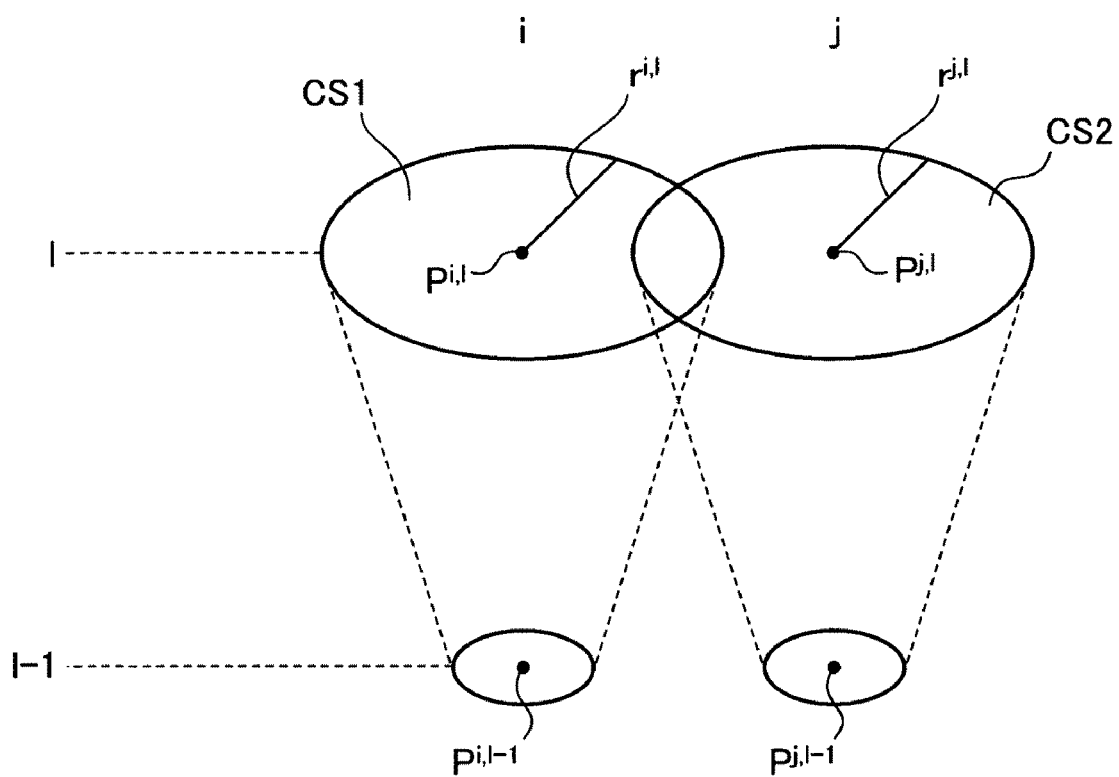
FIG. 9 is a diagram for explaining a repulsion energy calculation step.

Returning to FIG. 6, in step S22 the repulsion energy calculation portion 142 calculates the repulsion energy as described hereinafter. FIG. 9 is a diagram for explaining a repulsion energy calculation step. First, the repulsion energy calculation portion 142 sets one of the plurality of napped models the first target napped model, and a napped model intersecting with the first target napped model as the second target napped model. In FIG. 9 the $i^{th}$ napped model is set as the first target napped model, and a $j^{th}$ napped model is set as the target second napped model.

Next, the repulsion energy calculation portion 142 sets an $l^{th}$ cross section as first and second target cross sections CS1, CS2 in the first and second target napped model. When the first and second target cross sections CS1, CS2 intersect with each other, the repulsion energy calculation portion 142 calculates a repulsion energy $Eo^{i,l}$ of the first target cross section CS1 by using Equation (4).

$$Eo^{i,l}=(1/2)\cdot\{|p^{i,l}-p^{j,l}|-(r^{j,l}+r^{i,l})\}^2 \quad (4)$$

Specifically, when the first target cross section CS1 and the second target cross section CS2 intersect with each other, the repulsion energy calculation portion 142 calculates the repulsion energy $Eo^{i,l}$ of the first target cross section CS1 from a value that is obtained by squaring the difference between "$|p^{i,l}-p^{j,l}|$" representing the distance between the centers of the first and second cross sections CS1, CS2 and "$(r^{i,l}+r^{j,l})$" representing the sum of the radius of the first target cross section CS1 and the radius of the second target cross section CS2. Note that the radius of each cross section is calculated using Equation (1).

When, on the other hand, the first target cross section CS1 and the second cross section CS2 do not intersect with each other, the repulsion energy calculation portion 142 calculates the repulsion energy $Eo^{i,l}$ of the first target cross section using Equation (5).

$$Eo^{i,l}=0 \quad (5)$$

The repulsion energy calculation portion 142 then calculates repulsion energy $Eo^i$ of the first target napped model by multiplying the value obtained by adding up the repulsion energies $Eo^{i,l}$ of the first target cross sections CS1 (the value corresponding to the size of the region where the $i^{th}$ napped model overlaps with the $j^{th}$ napped model) by a repulsion coefficient $K^{i,j}$ between the $i^{th}$ napped model and the $j^{th}$ napped model, as shown in Equation (6).

$$E_o^i = \sum_{l=2}^{n} K^{i,j} E_o^{i,l} \quad (6)$$

Next, the repulsion energy calculation portion 142 adds up the repulsion energies $Eo^i$ of the first target napped models to calculate the repulsion energy Eo of the entire napped fabric model.

Returning to FIG. 6, the final shape calculation portion 143 adds the flexure energy Eb and the repulsion energy Eo to obtain a total energy E (step S23).

Next, the final shape calculation portion 143 determines whether the end points P converge in a position where the total energy E is minimum. When the positions of the end points P converge (YES in step S24), the final shape calculation portion 143 ends the correction processing and, when the positions of the end points P do not converge (NO in step S24), then advances the processing to step S25.

Next, in step S25, the final shape calculation portion 143 uses the steepest descent method or Newton method to correct the position of each end point P by shifting the position of each end point P by a predetermined step width so that the total energy E of the flexure energy Eb and repulsion energy Eo becomes minimum. The final shape calculation portion 143 then obtains the radius r of the cross section of the position of each of the corrected end points P by using Equation (1), to correct the shape of the napped models. Here, the final shape calculation portion 143 sets a cross section at the target end point CP such that it intersects with a line segment connecting the target end point CP to the end point P therebelow.

In this manner, the napped model generation portion 140 repeatedly corrects the shape of the napped models until the minimum value of the total energy E is obtained.

Returning to FIG. 5, in step S5 the final shape calculation portion 143 sets a polygon so as to smoothly connect an outer periphery of the cross section of each napped model, and generates a side surface of the napped model. The final shape calculation portion 143 also sets a polygon on the uppermost cross section of the napped model so that the uppermost cross section is smoothly connected to the side surface, and generates an upper surface of the polygon model. In this manner, a napped fabric model having the base texture model ZM and the napped model is generated.

Figure 10:
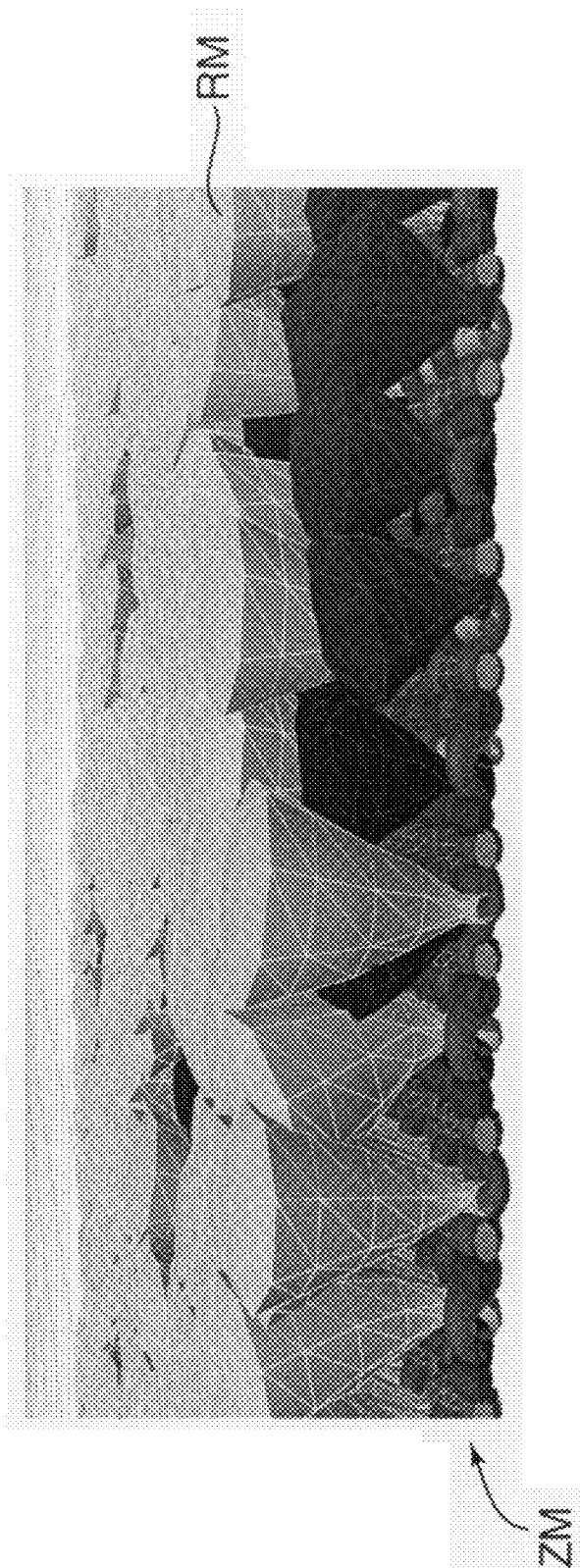
FIG. 10 is a diagram showing the napped models generated by a napped model generation portion.

FIG. 10 is a diagram showing the napped models generated by the napped model generation portion 140. As shown in FIG. 10, a plurality of napped models RM are generated on the surface of the base texture model ZM, and inclinations and heights of the napped models RM vary moderately. Also, the polygon that smoothly connects the outer periphery of the cross section is set on the side surface of each napped model RM. In addition, a polygon is set on the upper surface of each napped model RM so that the inclination thereof increases in the vicinity of the outer periphery, and the upper surface and side surface of the napped model RM are smoothly connected.

Returning to FIG. 5, in step S6 the napped model generation portion 140 stores the generated napped fabric in the napped fabric model storage unit 230. Next, when the operation command for rendering the sterical model stored in the sterical model storage unit 240 is received by the input portion 300, the rendering portion 150 reads out the napped fabric model from the napped fabric model storage unit 230 and the sterical model from the sterical model storage unit 240, attaches the napped fabric model to the sterical model by means of three-dimensional texture mapping, renders the sterical model (step S7), and causes the display portion 400 to display the sterical model. Here, the rendering portion 150 renders the sterical model by using, for example, a ray tracing. Note that the minimum unit of data on the napped fabric is stored in the napped fabric model storage unit 230, and the rendering portion 150 combines the minimum unit of napped fabrics in a plurality of ways in accordance with the size of the sterical model, and attaches the napped fabric model to the sterical model.

Figure 11:
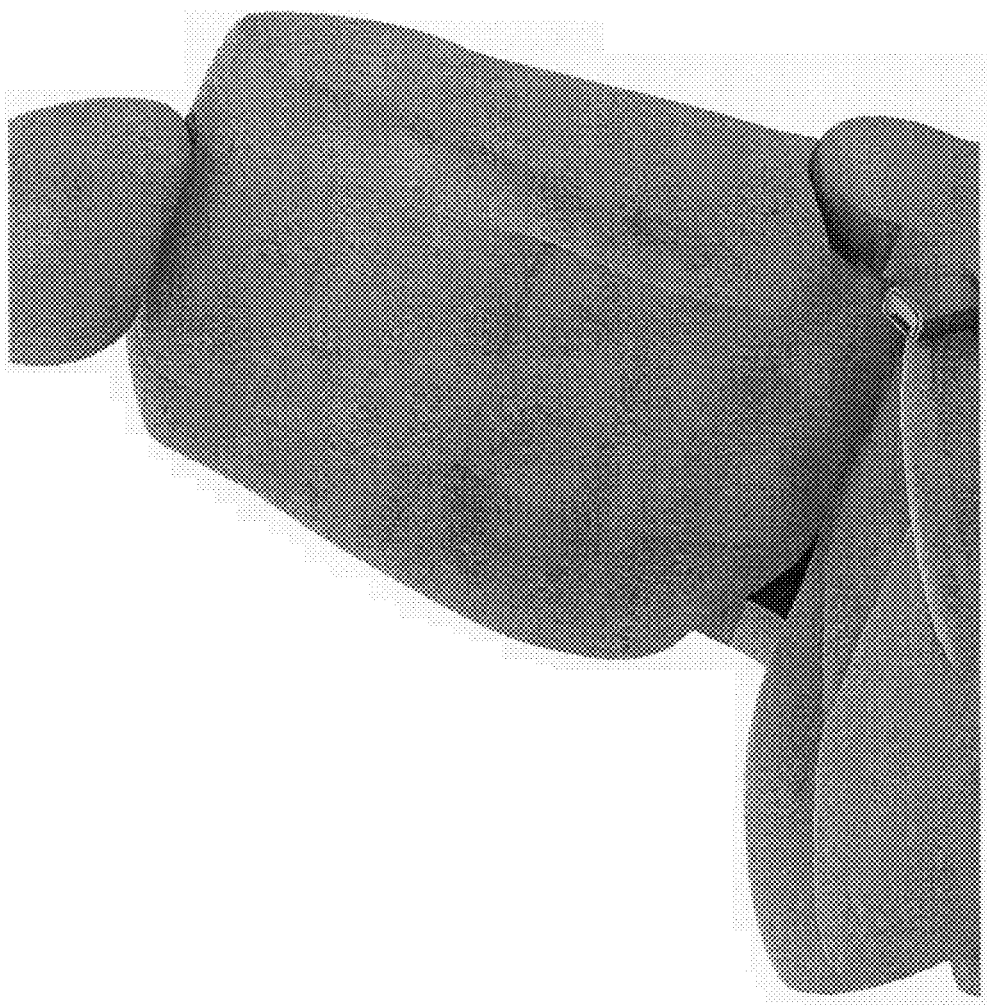
FIG. 11 is a diagram showing a rendering result obtained when a car seat is employed as a sterical model.

FIG. 11 is a diagram showing a rendering result obtained when a car seat is employed as the sterical model. As shown in FIG. 11, it can be seen that the material and texture of the surface of the car seat are reproduced realistically by performing the rendering using the napped fabric model.

Figure 12:
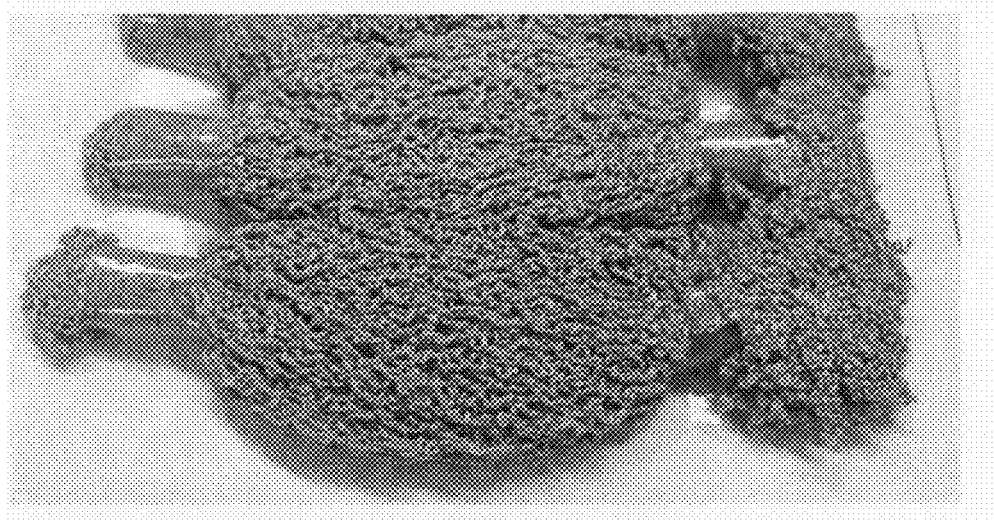
FIG. 12 is a diagram showing a real napped fabric composed of a crimp yarn.
Figure 13:
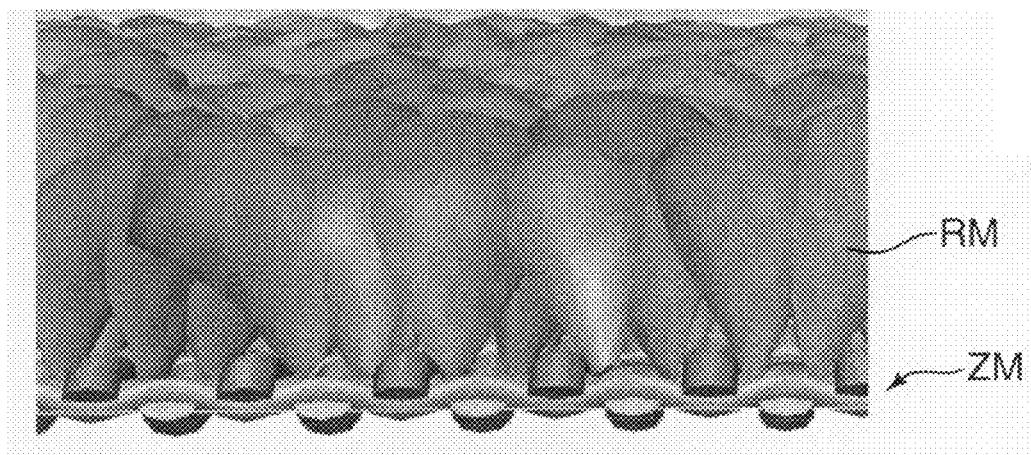
FIG. 13 is a diagram showing a napped fabric model of the napped fabric employing the crimp yarn.

FIG. 12 is a diagram showing a real napped fabric composed of a crimp yarn. FIG. 13 is a diagram showing the napped fabric model of the napped fabric employing the crimp yarn. A crimp yarn is a flexed stable yarn having thermal plasticity and generated by heat-setting a filament that is plain-knitted once, and canceling heat setting. By employing the crimp yarn in the napped fabric, the napped parts are oriented randomly without standing up.

When generating the napped fabric model using the crimp yarn in the fabric model generation apparatus, the napped fabric model can be realized by randomly providing variations to the inclination of the bias vector $v^{i,l}$ shown in Equations (2-1), (2-2). Specifically, the information storage unit 220 stores inclination information representing the bias vector $v^{i,l}$ that is previously defined for the crimp yarn, and, when an operation command for generating the napped fabric model using the crimp yarn is received by the input portion 300, the flexure energy calculation portion 141 reads out the inclination information for the crimp yarn from the information storage unit 220 and executes Equations (2-1), (2-2). The final shape calculation portion 143 deforms the upper surface of the napped model into a dome shape, as shown in FIG. 13. As a result, the napped fabric model in which the crimp yarn is used can be generated.

In addition, in the actual napped fabric, it is mostly the case that the napped parts are entirely inclined in a certain direction, due to manufacturing reasons. Therefore, in the fabric model generation apparatus, when the inclination information for providing a certain inclination to the napped parts is received by the input portion 300, the flexure energy calculation portion 141 provides an input inclination to the bias vector $v^{i,l}$ shown in Equations (2-1), (2-2) and calculates the flexure energy, in order to reproduce the inclination. Specifically, when a numerical value representing the inclination information of the napped parts is input by the input portion 300, the flexure energy calculation portion 141 provides this numerical value to bias vectors $v^{i,l}$. In this case, the flexure energy calculation portion 141 may provide the same numerical value of inclination to all bias vectors $v^{i,l}$ or may provide a variation to each bias vector $v^{i,l}$ so that the average value of the inclinations of all bias vectors $v^{i,l}$ becomes equal to the input numerical value.

Figure 14:
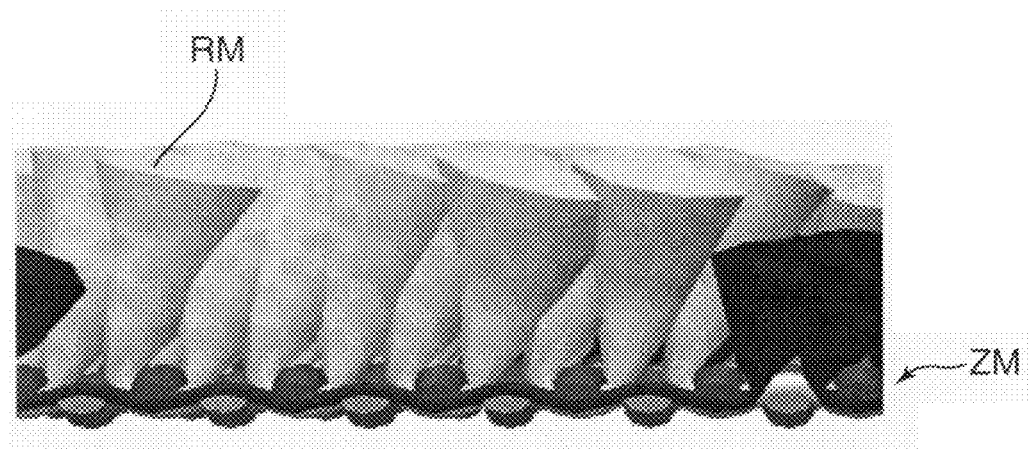
FIG. 14 is a diagram showing the napped fabric model obtained when inclination information is provided to a bias vector.

FIG. 14 is a diagram showing the napped fabric model obtained when the inclination information is provided to the bias vector $v^{i,l}$. As shown in FIG. 14, it can be seen that the napped fabric model is generated such that each napped fabric model has substantially constant inclination.

Figure 15:
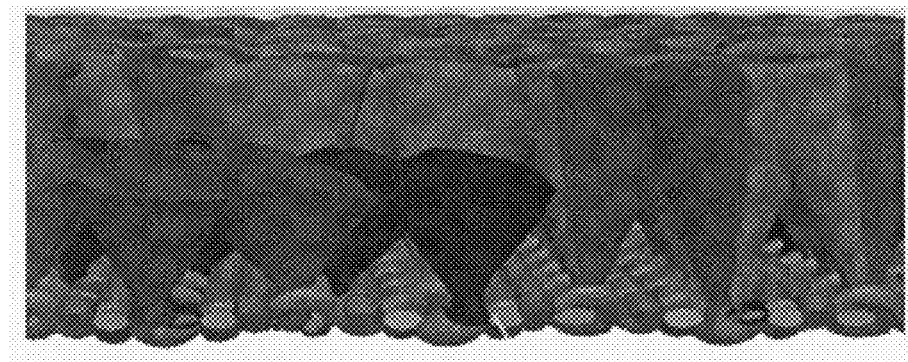
FIG. 15 shows the napped fabric model obtained when constant variations are applied to the height of the napped models in accordance with the type of yarn.

Moreover, the height of the napped parts may vary depending on the type of yarn configuring the napped parts. The fabric model generation apparatus can reproduce such height variation. Specifically, height information that is defined for each type of yarn is stored in the information storage unit 220. Here, the height information has values that vary in accordance with the positions of the starting points R3. When an operation command for specifying the type of yarn is received by the input portion 300, the placement portion 130 may read out the height information corresponding to the type of yarn from the information storage unit 220, determine the length of the napped center line RL positioned in each starting point R3 in accordance with the read height information, and place the napped center line RL in each starting point R3. FIG. 15 shows the napped fabric model obtained when constant variations are applied to the height of the napped models in accordance with the types of yarn. As shown in FIG. 15, it can be seen that the napped models RM of different heights are generated on the surface of the base texture model ZM.

As described above, because the shape of each napped model is changed such that the sum of the obtained flexure energy and repulsion energy becomes minimum, the fabric model generation apparatus can generate a napped fabric model in which the structure of each napped part is reproduced realistically.

(1) The computer-readable recording medium which stores the fabric model generation program according to the present invention is a fabric model generation program for generating a three-dimensional fabric model of a napped fabric that has a base texture part configured by a weaving texture or a knitting texture and a napped part rising from the base texture part, the fabric model generation program causing a computer to function as: a base texture model acquisition portion for acquiring a base texture model, which is a three-dimensional model of the base texture part created beforehand within a three-dimensional space; an information acquisition portion for acquiring a degree of defiberation representing a characteristic of yarn fibers attempting to be opened toward a leading end part of each of yarns used in the napped part, the yarn fibers configuring the yarns, a yarn stiffness coefficient representing a degree of a characteristic of the yarns attempting not to flex, and a repulsion coefficient representing a characteristic of the yarns attempting to repel each other; a placement portion for calculating an initial shape of napped models on the basis of the degree of defiberation, the napped models each being a three-dimensional model of the napped part, and placing the napped models having the calculated initial shape in predetermined positions of the base texture model; and a napped model generation portion for calculating a flexure energy representing a degree of flexing of the napped models on the basis of the yarn stiffness coefficient, calculating a repulsion energy representing an energy between the napped models repelling each other, on the basis of the repulsion coefficient, and correcting the shape of the napped models so that the both energies become minimum.

The fabric model generation apparatus according to the present invention is a fabric model generation apparatus for generating a three-dimensional fabric model of a napped fabric that has a base texture part configured by a weaving texture or a knitting texture and a napped part rising from the base texture part, the fabric model generation apparatus having: a base texture model acquisition portions for acquiring a base texture model, which is a three-dimensional model of the base texture part created beforehand within a three-dimensional space; an information acquisition portion for acquiring a degree of defiberation representing a characteristic of yarn fibers attempting to be opened toward a leading end part of each of yarns used in the napped part, the yarn fibers configuring the yarns, a yarn stiffness coefficient representing a degree of a characteristic of the yarns attempting not to flex, and a repulsion coefficient representing a characteristic of the yarns attempting to repel each other; a placement portion for calculating an initial shape of napped models on the basis of the degree of defiberation, the napped models each being a three-dimensional model of the napped part, and placing the napped models having the calculated initial shape in predetermined positions of the base texture model; and a napped model generation portion for calculating a flexure energy representing a degree of flexing of the napped models on the basis of the yarn stiffness coefficient, calculating a repulsion energy representing an energy between the napped models repelling each other, on the basis of the repulsion coefficient, and correcting the shape of the napped models so that the both energies become minimum.

The fabric model generation method according to the present invention is a fabric model generation method for generating a three-dimensional fabric model of a napped fabric that has a base texture part configured by a weaving texture or a knitting texture and a napped part rising from the base texture part, the fabric model generation method having: a step in which a computer acquires a base texture model, which is a three-dimensional model of the base texture part created beforehand within a three-dimensional space; a step in which the computer acquires a degree of defiberation representing a characteristic of yarn fibers attempting to be opened toward a leading end part of each of yarns used in the napped part, the yarn fibers configuring the yarns, a yarn stiffness coefficient representing a degree of a characteristic of the yarns attempting not to flex, and a repulsion coefficient representing a characteristic of the yarns attempting to repel each other; a step in which the computer calculates an initial shape of napped models on the basis of the degree of defiberation, the napped models each being a three-dimensional model of the napped part, and places the napped models having the calculated initial shape in predetermined positions of the base texture model; and a step in which the computer calculates a flexure energy representing a degree of flexing of the napped models on the basis of the yarn stiffness coefficient, calculates a repulsion energy representing an energy between the napped models repelling each other, on the basis of the repulsion coefficient, and corrects the shape of the napped models so that the both energies become minimum.

According to these configurations, the placement portion calculates the initial shape of each napped model by using the degree of defiberation representing a characteristic of yarn fibers attempting to be opened toward a leading end part of each of yarns used in the napped part, the yarn fibers configuring the yarns, and places the napped models in predetermined positions. The napped model generation portion calculates the flexure energy representing the degree of flexing of the napped models disposed in the base texture model, by using the yarn stiffness coefficient representing the degree of a characteristic the yarns attempting not to flex, calculates the repulsion energy representing an energy between the napped models repelling each other, the napped models being disposed in the base texture model, and corrects the shape of the napped models so that the flexure energy and the repulsion energy become minimum.

Specifically, because the shape of each napped model is corrected with the introduction of the concept of the flexure energy and repulsion energy of the napped models so that the both energies become minimum, a napped fabric model in which the structure of the napped part is reproduced realistically can be generated.

(2) It is preferred that the placement portion place, as a napped center line, a line segment of a predetermined length in a height direction perpendicular to a surface of the base texture model, divide the napped center line into a plurality of line segments, set an upper end of each line segment as an end point, sequentially set any one of the end points as a target end point, set, as a radius, a value obtained by performing a predetermined calculation based on the predetermined length, a height of the target end point and the degree of defiberation, set a circle orthogonal to the napped center line as a cross section of each of the napped models at the target end point, and calculate the initial shape.

According to this configuration, because a plurality of end points are set on the napped center line and the initial shape of the napped model is calculated by setting a cross section in each end point, the amount of calculation can be reduced.

(3) It is preferred that the napped model generation portion sequentially set, as the target end point, an uppermost end point of three vertically-placed consecutive end points among the end points set on the napped center line, calculate a correction target position of the target end point on the basis of the direction of a line segment connecting an end point right below the target end point to a second end point below the target end point, calculate a flexure energy of the target end point by multiplying a difference between the target end point and the correction target position by the yarn stiffness coefficient, and calculate a flexure energy of the entire napped fabric model by adding up the flexure energy of the each target end point.

According to this configuration, out of the plurality of end points on the napped center line, an uppermost end points of vertically placed consecutive three end points is sequentially set as a target end point, a correction target position of the target end point is calculated on the basis of the direction of a line segment connecting an end point right below the target end point to a second end point below the target end point, a flexure energy of the target end point is calculated by multiplying the difference between the target end point and the correction target position by the yarn stiffness coefficient, and a flexure energy of the entire napped fabric model is calculated by adding up the flexure energies of the target end points. Therefore, a napped fabric model in which the structure of each napped part is reproduced realistically can be generated.

(4) It is preferred that the information acquisition portion acquire inclination information for providing a bias to an inclination of each of the napped models with respect to the surface of the base texture model, and that the napped model generation portion correct the correction target position by using the inclination information.

According to this configuration, a base can be provided to the inclination of each napped model in accordance with the inclination information, and a napped fabric model such as a napped fabric in which a crimp yarn is used can be reproduced realistically.

(5) It is preferred that the napped model generation portion sequentially set one of the plurality of napped models as a first target napped model, set a napped model overlapping with the first target napped model as a second target napped model, calculate, as a repulsion energy of the first target napped model, a value that is obtained by multiplying a value corresponding to the size of a region where the first target napped model overlaps with the second target napped model by the repulsion coefficient, and add up the repulsion energy of the first target napped model to thereby calculate a repulsion energy of the entire napped fabric model.

According to this configuration, because a value that is obtained by multiplying a value representing to the size of a region, where the first target napped model overlaps with the second target napped model in place of the first target napped model, by the repulsion coefficient is calculated as a repulsion energy of the first target napped model, and the repulsion energy of the first target napped model is added up to calculate a repulsion energy of the napped fabric model, a more realistic napped fabric model can be generated.

(6) It is preferred that the napped model generation portion calculate a total energy of the flexure energy and the repulsion energy, correct the position of the target end point so that the total energy becomes minimum, and correct the shape of the napped models by correcting the size of a cross section of the target end point.

According to this configuration, because a total energy of the flexure energy and the repulsion energy is calculated, position of each target end point and the size of the cross section of each target end point are corrected to correct the shape of the napped models, the amount of calculation required in the processing for correcting the shape of the napped models can be reduced.

The invention claimed is:

1. A computer-readable recording medium which stores a fabric model generation program for generating a napped fabric model which is a three-dimensional model of a napped fabric that has a base texture part configured by a weaving texture or a knitting texture and a plurality of napped parts rising from the base texture part, the fabric model generation program causing a computer to function as:
    a base texture model acquisition portion for acquiring a base texture model, which is a three-dimensional model of the base texture part created beforehand in a three-dimensional space;
    an information acquisition portion for acquiring a degree of defiberation representing a degree of a characteristic of yarn fibers attempting to open toward a leading end part of each of yarns used in the napped parts, with the yarn fibers serving to configure the yarns, a yarn stiffness coefficient representing a degree of a characteristic of the yarns attempting not to flex, and a repulsion coefficient representing a degree of a characteristic of the yarns attempting to repel each other;
    a placement portion for calculating, on the basis of the degree of defiberation, an initial shape of napped models, which are three-dimensional models of the napped part, and placing the napped models having the calculated initial shape in predetermined positions of the base texture model; and
    a napped model generation portion for calculating a flexure energy representing a degree of flexing of the napped models on the basis of the yarn stiffness coefficient, calculating a repulsion energy representing an energy between the napped models repelling each other, on the basis of the repulsion coefficient, and correcting the shape of the napped models so that the both energies become minimum.

2. The computer-readable recording medium according to claim 1, wherein the placement portion places, as a napped center line, a line segment of a predetermined length in a height direction perpendicular to a surface of the base texture model, divides the napped center line into a plurality of line segments, sets an upper end of each line segment as an end point, sequentially sets any one of end points as a target end point, sets, as a radius, a value obtained by performing a predetermined calculation based on the predetermined length, a height of the target end point and the degree of defiberation, and sets a circle orthogonal to the napped center line as a cross section of each of the napped models at the target end point, in order to calculate the initial shape.

3. The computer-readable recording medium according to claim 2, wherein the napped model generation portion sequentially sets, as the target end point, an uppermost end point of three vertically-placed consecutive end points from among the end points set on the napped center line and calculates a correction target position of the target end point on the basis of a direction of a line segment connecting an end point immediately below the target end point to an end point below this end point, and calculates a flexure energy of the target end point by multiplying a difference between the target end point and the correction target position by the yarn stiffness coefficient, and also calculates a flexure energy of the entire napped fabric model by adding up the flexure energy of the each target end point.

4. The computer-readable recording medium according to claim 3, wherein
the information acquisition portion acquires inclination information for providing a bias to an inclination of each of the napped models with respect to the surface of the base texture model, and
the napped model generation portion corrects the correction target position by using the inclination information.

5. The computer-readable recording medium according to claim 2, the napped model generation portion sequentially sets one of the plurality of napped models as a first target napped model, sets a napped model overlapping with the first target napped model as a second target napped model, and calculates, as a repulsion energy of the first target napped model, a value that is obtained by multiplying a value corresponding to a size of a region, where the first target napped model overlaps with the second target napped model, by the repulsion coefficient, and adds up the repulsion energy of the first target napped model to thereby calculate a repulsion energy of the entire napped fabric model.

6. The computer-readable recording medium according to claim 2, wherein the napped model generation portion calculates a sum energy of the flexure energy and the repulsion energy, corrects the position of the target end point so that the sum energy becomes minimum, and corrects the shape of the napped models by correcting the size of a cross section of the target end point.

7. A fabric model generation apparatus for generating a fabric model which is a three-dimensional model of a napped fabric that has a base texture part configured by a weaving texture or a knitting texture and napped parts rising from the base texture part, the fabric model generation apparatus comprising:
a base texture model acquisition portion for acquiring a base texture model, which is a three-dimensional model of the base texture part created beforehand in a three-dimensional space;
an information acquisition portion for acquiring a degree of defiberation representing a degree of a characteristic of yarn fibers attempting to open toward a leading end part of each of yarns used in the napped parts, with the yarn fibers serving to configure the yarns, a yarn stiffness coefficient representing a degree of a characteristic of the yarns attempting not to flex, and a repulsion coefficient representing a degree of a characteristic of the yarns attempting to repel each other;
a placement portion for calculating, on the basis of the degree of defiberation, an initial shape of napped models, which are three-dimensional models of the napped part, and placing the napped models having the calculated initial shape in predetermined positions of the base texture model; and
a napped model generation portion for calculating a flexure energy representing a degree of flexing of the napped models on the basis of the yarn stiffness coefficient, calculating a repulsion energy representing an energy between the napped models repelling each other on the basis of the repulsion coefficient, and correcting the shape of the napped models so that the both energies become minimum.

8. A fabric model generation method for generating a fabric model which is a three-dimensional model of a napped fabric that has a base texture part configured by a weaving texture or a knitting texture and napped parts rising from the base texture part, the fabric model generation method comprising:
a step in which a computer acquires a base texture model, which is a three-dimensional model of the base texture part created beforehand in a three-dimensional space;
a step in which the computer acquires a degree of defiberation representing a degree of a characteristic of yarn fibers attempting to open toward a leading end part of each of yarns used in the napped parts, with the yarn fibers serving to configure the yarns, a yarn stiffness coefficient representing a degree of a characteristic of the yarns attempting not to flex, and a repulsion coefficient representing a degree of a characteristic of the yarns attempting to repel each other;
a step in which the computer calculates, on the basis of the degree of defiberation, an initial shape of napped models, which are three-dimensional models of the napped part, and places the napped models having the calculated initial shape in predetermined positions of the base texture model; and
a step in which the computer calculates a flexure energy representing a degree of flexing of the napped models on the basis of the yarn stiffness coefficient, calculates a repulsion energy representing an energy between the napped models repelling each other on the basis of the repulsion coefficient, and corrects the shape of the napped models so that the both energies become minimum.

* * * * *